United States Patent
Jamasbi

[11] Patent Number: 6,084,026
[45] Date of Patent: Jul. 4, 2000

[54] COATING COMPOSITIONS HAVING EXTENDED POT LIFE AND SHORTENED CURE TIME AND COMBINATION OF CHEMICALS USED THEREIN

[75] Inventor: Homayoun Jamasbi, Blue Bell, Pa.

[73] Assignee: Rohm and Haas Company, Philadelphia, Pa.

[21] Appl. No.: 09/088,509

[22] Filed: Jun. 1, 1998

Related U.S. Application Data

[60] Provisional application No. 60/048,737, Jun. 5, 1997.

[51] Int. Cl.⁷ .................... C08J 3/00; C08K 3/20; C08L 75/00; C08G 18/00; C08G 18/81

[52] U.S. Cl. ............... 524/590; 428/423.1; 524/589; 524/591; 525/123; 525/455; 528/44; 528/45; 528/48; 528/58

[58] Field of Search .................... 524/589, 590, 524/591; 528/44, 45, 48, 58; 525/123, 455; 428/423.1

[56] References Cited

U.S. PATENT DOCUMENTS

| | | | |
|---|---|---|---|
| 4,403,086 | 9/1983 | Holubka et al. | 528/45 |
| 4,430,489 | 2/1984 | MacMillan et al. | 528/45 |
| 4,657,613 | 4/1987 | Thoma et al. | 156/238 |
| 5,157,100 | 10/1992 | Babjak et al. | . |
| 5,191,029 | 3/1993 | DelDonno | . |
| 5,200,264 | 4/1993 | Frentzel | 428/323 |
| 5,412,056 | 5/1995 | Zwiener et al. | . |

*Primary Examiner*—Patrick D. Niland
*Attorney, Agent, or Firm*—Wendy A. Choi; Sudhir G. Deshmukh

[57] ABSTRACT

A combination of chemicals suitable for extending pot life and shortening cure time of a pot mix of a thermosetting composition is disclosed. The combination of chemicals includes a catalyst, such as, dibutyl tin dilaurate; carboxylic or sulfonic acid; and an extender compound, such as 2,4 pentanedione. The combination is generally included in a polymeric component of the urethane composition. The extended pot life provides the user with longer open time during which to efficiently apply a coating of the pot mix over a wide variety of substrate surfaces while still producing coatings that cure quickly upon application.

7 Claims, No Drawings

6,084,026

COATING COMPOSITIONS HAVING EXTENDED POT LIFE AND SHORTENED CURE TIME AND COMBINATION OF CHEMICALS USED THEREIN

This Appln claims benefit of Provisional Appln No. 60/048,737 Jun. 5, 1997.

FIELD OF INVENTION

The present invention generally relates to thermosetting compositions and more particularly to urethane compositions having an increased pot life/drying time ratio and a combination of chemicals used therein.

BACKGROUND OF THE INVENTION

The artisans in the coatings art have long sought, throughout the history, to produce coatings from a pot mix of thermosetting compositions thatdries or cures quickly upon application while simultaneously having extended pot life. The extended pot life provides the user with more flexibility in efficiently applying a coating by conventional application means, such as spray guns, paint brushes or paint rollers over a variety of substrate surfaces.

DelDonno in U.S. Pat. No. 4,426,510 (hereafter the '510 patent) attempted to solve this problem by incorporating an organo-zinc cure rate catalyst and a compound selected from (a) beta-dicarbonyl compounds, (b) alpha-hydroxy ketones, (c) fused aromatic beta-hydroxy ketones, and (d) beta-hydroxy nitrogen-heterocyclic fused aromatics in coating or adhesive compositions to extend the pot life and shorten the cure time of pot mixes of these compositions. However, there is a need to further extend the pot life and shorten the cure time of thermosetting compositions. The present invention addresses this problem by incorporating a combination of chemicals in thermosetting compositions to further extend the pot life and shorten the cure time of a coating from a pot mix of such thermosetting compositions.

STATEMENT OF THE INVENTION

The present invention is directed to a combination of chemicals for increasing a pot life/drying time ratio of a thermosetting composition comprising in the range of from 0.001 to 2.0 percent of a catalyst, in the range of from 0.05 to 2 percent of carboxylic or sulfonic acid, and in the range of from 1 to 10 percent of an extender compound selected from (a) beta-dicarbonyl compounds, (b) alpha-hydroxy ketones, (c) fused aromatic beta-hydroxy ketones, (d) beta-hydroxy nitrogen-heterocyclic fused aromatics and (e) various combinations thereof, all percentages being in weight percentages based on the total weight of polymeric component solids of said thermosetting composition.

The present invention is further directed to a method of increasing pot life/drying time ratio of a thermosetting composition comprising mixing with said thermosetting composition a combination of chemicals comprising in the range of from 0.001 to 2.0 percent of a catalyst, in the range of from 0.05 to 2 percent of carboxylic or sulfonic acid, and in the range of from 1 to 10 percent of an extender compound selected from (a) beta-dicarbonyl compounds, (b) alpha-hydroxy ketones, (c) fused aromatic beta-hydroxy ketones, (d) beta-hydroxy nitrogen-heterocyclic fused aromatics and (e) various combinations thereof, all percentages being in weight percentages based on the total weight of polymeric component solids of said thermosetting composition.

The present invention is still further directed to a method of producing a coating on the surface of a substrate comprising:

mixing a polymeric component of a thermosetting composition with a cross linking component of said composition to form a pot mix, wherein said pot mix includes a combination of chemicals comprising in the range of from 0.001 to 2.0 percent of a catalyst, in the range of from 0.05 to 2 percent of carboxylic or sulfonic acid, and in the range of from 1 to 10 percent of an extender compound selected from (a) beta-dicarbonyl compounds, (b) alpha-hydroxy ketones, (c) fused aromatic beta-hydroxy ketones, (d) beta-hydroxy nitrogen-heterocyclic fused aromatics and (e) various combinations thereof, all percentages being in weight percentages based on the total weight of said polymeric component solids of said thermosetting composition;

applying a layer of said pot mix on the surface of said substrate; and curing said layer to form said coating on said surface.

DETAILED DESCRIPTION OF THE INVENTION

As used herein:

"Thermosetting Compositions (or systems)" means compositions which include a polymeric component and an isocyanate crosslinking component. These components are stored separately and mixed, just before use, to form a pot mix, which is then applied as a layer by conventional means, such as by brushing or spraying, over the surfaces of substrates. Upon curing, the layer becomes a coating having the desired coating properties, such as durability, water and resistance, mar resistance, block resistance.

"Pot life" refers to the period of time at the end of which the initial viscosity of a pot mix doubles. The initial viscosity is the viscosity of the pot mix measured soon after the mixing of the polymeric and crosslinking components.

"Polyol, Polymeric Component or Composition Solids" means polyol, polymeric component or composition in its dry state.

Ranges specified are to be read as inclusive, unless specifically identified otherwise.

The applicant has unexpectedly discovered that the ratio of pot life/drying time of a pot mix of a thermosetting composition can be increased by including a certain combination of chemicals of the present invention in such a thermosetting composition. An increase in the ratio of pot life/drying time, which is highly desired by artisans in the coating art, results in simultaneously extending the pot life while decreasing the drying time of a layer of the pot mix of the thermosetting composition applied over a substrate surface.

The combination of chemicals of the present invention for increasing a pot life/drying time ratio of the thermosetting composition includes in the range of from 0.001 to 2.0 percent, preferably in the range of from 0.005 percent to 0.05 percent and more preferably in the range of from 0.008 percent to 0.012 percent of a catalyst, in the range of from 0.05 to 2 percent, preferably in the range of from 0.1 to 1 percent and more preferably in the range of from 0.2 to 0.7 percent of carboxylic, sulfonic acid, or a blend thereof and in the range of from 1 to 10 percent, preferably in the range of from 2 to 6 percent of an extender compound selected from (a) beta-dicarbonyl compounds, (b) alpha-hydroxy ketones, (c) fused aromatic beta-hydroxy ketones, (d) beta-hydroxy nitrogen-heterocyclic fused aromatics and (e) various combinations thereof, all percentages being in weight percentages based on the total weight of polymeric component solids of said thermosetting composition.

Some of the catalysts suitable for use in the combination of chemicals of the present invention include metal compounds, such as a tin compound and ferric acetylacetonate; tertiary amines, such as triethylenediamine, N-alkyl morpholines, N,N,N',N'-tetramethyl-ethylene-diamine, N,N,N',N'-tetramethyl-1,3-butane-diamine, N,N'-substituted piperazines, and dialkyl-alkanol-amines; and various combinations thereof Metal compounds are preferred, tin compounds are more preferred and dibutyl tin dilaurate is particularly preferred.

Some of the carboxylic acids suitable for use in the combination of chemicals of the present invention include monofunctional aliphatic acids, such as, acetic, butyric, propionic, acrylic and methacrylic acids; monofunctional aromatic acids, such as, phenylacetic, benzoic, p-methylbenzoic, p-nitrobenzoic, p-chlorobenzoic, and p-methoxybenzoic acids; and various combinations thereof. Benzoic acid is preferred.

Some of the sulfonic acids suitable for use in the combination of chemicals of the present invention include p-toluenesulfonic, methanesulfonic, benzenesulfonic acids, and various combinations thereof.

The combination of the chemicals of the present invention preferably includes the carboxylic acid and it most preferably includes benzoic acid.

The extender compounds suitable for use in the combination of chemicals of the present invention preferably include beta-dicarbonyl compounds. The preferred beta-dicarbonyl compounds have the following formula:

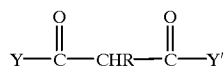

in which R is hydrogen, lower-alkyl or aryl, Y and Y' are aryl or —CXX'B wherein X and X' are hydrogen or halogen, and B is hydrogen, halogen or lower-alkyl. Typical beta-diketones of this structure include:

2,4-pentanedione, 1,1,1-trifluoro-2,4-pentanedione, 1,1,1,5,5,5-hexafluoro-2,4-pentanedione, 2,4-hexanedione, 2,4-heptanedione, 5-methyl-2,4-hexanedione 2,4-octanedione, 5,5-dimentyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4,-pentanedione, 1-phenyl-5, 5-dimethyl-2,4-hexanedione, 1-phenyl-2-butyl- 1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione and dibenzoylmethane. The particularly preferred extender compound is 2,4-pentanedione.

Another class of beta-dicarbonyl compound is beta-keto esters of the formula:

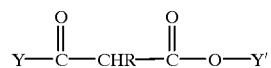

in which R is hydrogen, lower-alkyl or aryl, Y and Y' are aryl or —CXX'B wherein X and X' are hydrogen or halogen, and B is hydrogen, halogen or lower-alkyl. Typical examples of these esters are methyl acetoacetate, ethyl acetoacetate, alpha-methyl ethyl acetoacetate, alpha-n-butyl ethylacetoacetate, alpha-secbutyl ethyl acetoacetate, alpha ethyl methyl acetoacetate, and alpha-ethyl ethyl acetoacetate. Other beta dicarbonyl compounds which are suitable include alpha-acetyl-butyrolactone, dimedone and 1-hydroxyanthraquinone.

Another class of suitable extender compounds is alpha-hydroxy ketones. The preferred alpha-hydroxy ketones are those of the formula:

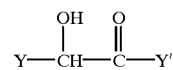

in which Y and Y' are aryl or —CXX'B wherein X and X' are hydrogen or halogen, and B is hydrogen, halogen or lower-alkyl. Typical examples of alpha-hydroxy ketones of this structure include benzoin, acetoin and alpha-hydroxy acetophenone.

Another class of compounds which function as extender compounds in accordance with this invention are fused aromatic beta-hydroxy ketones in which the hydroxyl group is attached to a carbon in an adjacent ring, beta to the keto group.

Typical examples of beta-hydroxy ketones of this type include naphthazarin 1-hydroxy-9-fluorenone and 1-hydroxy anthraquinone.

Still another class of suitable extender compounds is beta hydroxy nitrogen-heterocyclic fused aromatics in which the hydroxyl group is attached to a carbon in an adjacent ring beta, to the nitrogen The preferred beta-hydroxy nitrogen-heterocyclic fused aromatics are the 8-hydroxyquinolines. Other fused aromatics of this type include 7-hydroxy-3-hydrogen indoles, 8-hydroxy quinoxalines, 8-hydroxy quinazolines, 8-hydroxy cinnolines, 4-hydroxy phenanthridines, and 4-hydroxy acridines and 1-hydroxy phenazines.

The solids content of the polymeric component of the thermosetting composition suitable for use in the present invention generally varies in the range of from 30 weight percent to 95 weight percent, preferably in the range of from 60 weight percent to 95 weight percent and more preferably in the range of from 70 weight percent to 95 weight percent, all weight percentages being based on the total weight of the polymeric component.

The polymeric component of the thermosetting composition suitable for use in the present invention includes an organic polyol having at least one hydroxyl functionalities that result from polymerizing a monomer mixture containing at least one hydroxyl monomer. The monomer mixture includes in the range from 5 to 90 weight percent, preferably, in the range from 10 to 35 weight percent and more preferably in the range from 10 to 20 weight percent of at least one hydroxyl monomer, all the weight percentages being based on the total weight of polymeric component solids.

The GPC weight average molecular weight of the polyol is suitably adjusted to provide desired coating properties. The polyol is preferably provided with a GPC weight average molecular weight varying in the range of from 3,000 to 100,000, preferably in the range of from 5,000 to 50,000, more preferably in the range of from 6,000 to 20,000. If the GPC weight average molecular weight of the polyol is less than 3,000, a coating resulting from a thermosetting composition containing such a polyol would be too soft, which thereby would result in loss of coating properties, such as, durability, chemical resistance and gloss retention. If the GPC weight average molecular weight of the polyol exceeds 100,000, a thermosetting composition, which includes such a polyol would have unacceptably high working viscosity.

The Tg of the polyol as determined by using Fox equation typically varies in the range of from −40° C. to 150° C.

Preferred examples of the hydroxyl monomers include 2-hydroxyethyl acrylate, 2-hydroxyethyl methacrylate, 2-hydroxypropyl acrylate, 2-hydroxyethyl acrylate, 2-hydroxypropyl methacrylate, 2-hydroxybutyl methacrylate, 1,4-butanediol acrylate or methacrylate, hydroxyethyl fumarate, butyl hydroxyethyl maleate, and hydroxyethyl oxyethyl methacrylate. More preferred active hydrogen containing monomers include 2-hydroxypropyl methacrylate or 2-hydroxyethyl methacrylate.

The balance of the monomer mixture can include a variety of other monomers. For example, alkyl acrylates and methacrylates which contain from 1 to 18 carbon atoms, preferably 4 to 10 carbon atoms in the alkyl portion, such as methyl(meth)acrylate, ethyl (meth)acrylate, propyl(meth)acrylate and butyl(meth)acrylate, 2-ethylhexyl methacrylate, stearyl methacrylate, and isobornyl methacrylate.

Besides the acrylates and methacrylates, other copolymerizable monomers which can be copolymerized with the active hydrogen containing monomers include ethylenically unsaturated materials, such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids. Examples of such monomers include styrene, 1,3-butadiene, acrylonitrile, alpha-methyl styrene, alpha-methyl chlorostyrene, vinyl butyrate, vinyl acetate, allyl chloride, divinyl benzene, diallyl itaconate, triallyl cyanurate, vinyl toluene and mixtures thereof.

For the purposes of regulating the molecular weight of the polyol being formed, suitable chain-transfer agents may be used. Typically the lower the amount of chain transfer agent used, the higher will be the molecular weight of the resulting polyol and vice versa. Thus, in order to produce a polyol of having the GPC weight average molecular weight in the desired range stated earlier, the chain-transfer agent in the range of from 1 to 20 percent, preferably in the range of from 2 to 10 and more preferably in the range of from 5 to 8 percent, is added to the reaction mixture, typically before the initiation of the polymerization process. All the foregoing percentages are weight percentages based on the total weight of the polymeric component solids. The amount of a chain-transfer agent needed to achieve a particular molecular weight, moreover, can be estimated by the use of the Mayo equation. (See, e.g., pages 226–233 of a text entitled *Principles of Polymerization*, second edition, by George Odian, published 1981 by John Wiley & Sons, Inc.).

Some of suitable chain transfer agents include butyl mercapto propionate; iso octyl mercapto propionic acid; 3-mercapto propionic acid; isooctyl mercapto propionate; tert-butyl and ethyl mercaptoacetate; alkyl mercaptans, such as ethyl mercaptan, ethyl mercaptan, hexyl mercaptan, n-dodecyl mercaptan, 1-dodecanethiol, tertiary-dodecyl mercaptan, octyl mercaptan, tetradecyl mercaptan, and hexadecyl mercaptan; or various combinations thereof.

The viscosity of the polymeric component typically varies in the range of from 100 cps to 15,000 cps, preferably in the range of from 100 cps to 10,000 cps and more preferably in the range of from 100 cps to 8,000 cps, all viscosity measurement being conducted at 25° C. using No. 3 spindle @ 12 rpm on Brookfield Model LVTD-II Viscometer supplied by Brookfield Engineering Laboratories INC., Stoughton, Mass.

The thermosetting composition suitable for use in the present invention preferably includes a solvent. The amount of the solvent in the composition generally varies in the range of from 5 percent to 40 percent, preferably in the range of from 5 percent to 20 percent and more preferably in the range of from 8 percent to 12 percent, all in weight percentages based on the total weight of the thermosetting composition. The solvent is preferably added to the polymeric component. The small amount of solvent is typically added to reduce the viscosity of the pot mix of the composition of the present invention to less than 1500 cps. The solvent may be added before, during or after the polymerization of the monomer mixture into the polyol. Some of the suitable solvents include aromatic hydrocarbons, such as benzene, toluene, xylene, Aromatic-100™ and Aromatic-150™ aromatic solvents marketed by Exxon Corporation, Houston Tex.; alcohols, such as ethanol, iso-propanol, n-butanol, t-butanol, and ethylhexanol; esters, such as ethyl acetate, propyl acetate, butyl acetate, isobutyl acetate, dibasic esters, propylene glycol monomethylether acetate, ethylene glycol monomethylether acetate, and Exxate™ ester solvents marketed by Exxon Corporation, Houston Tex. Other useful solvents include ketones, such as, methyl ethyl ketone, methyl amyl ketone, methyl isobutyl ketone, diacetone alcohol, 2,4-pentanedione, and isophorone; glycols, such as propylene glycol and diethyl glycol; glycol ethers, such as propylene glycol monomethylether, ethylene glycol monomethylether, dipropylene glycol monomethylether, n-propoxypropanol, chlorinated solvents, such as methylene chloride, ethylene dichloride, 1,1,1-trichloroethane, and perchlorethylene; and fluorinated solvents, such as benzotrifluoride and p-chlorobenzotrifluoride. Various combination of solvents, such as butyl acetate and methyl ethyl ketone, or propylene glycol monomethylether acetate and methyl amyl ketone or butyl acetate and 2,4-pentanedione can be used. Butyl acetate is the preferred choice.

The isocyanate cross linking component suitable for use in the present invention is capable of reacting with the hydroxyl functionalities of the polyol. Generally a molar equivalent amount of the cross linking component is mixed with a molar equivalent amount of the polyol to form the pot mix. Preferably, the cross linking component is mixed with the polymeric component in a proportion, expressed as a ratio of the isocyanate (NCO) functionalities on the crosslinking component to the hydroxyl (OH) functionalities of the polyol, in the range of from 1.0 to 1.4, preferably in the range of from 1.0 to 1.25 and most preferably in the range which varies from 1.0 to 1.2. The ratio in the foregoing range ensures that sufficient degree of reactivity is maintained between the reactive groups on the cross linking component and the polymeric component. If the ratio drops below the lower limit of the foregoing range, desired degree of curing will not occur and if the ratio exceeds the upper limit of the foregoing range, excessive crosslinking will occur, which will result in a brittle coating having poor adhesion and having tendency to crack and peel away from the substrate. Furthermore, the presence of excessive isocyanate in the composition results in coatings having low gloss as the excessive isocyanate tend s to react with the moisture in the air to produce coatings having low gloss.

The isocyanate functionalities on the crosslinking component include those provided by aliphatic diisocyanates, such as trimethylene diisocyanate, tetramethylene diisocyanate, pentamethylene diisocyanate, hexamethylene diisocyanate, octamethylene diisocyanate, decamethylene diisocyanate, butylene-1,2-diisocyanate, butylene-1,3-diisocyanate, ethylidene diisocyanate; cycloaliphatic diisocyanates, such as cyclohexylene diisocyanate, 4,4'-methylene bis(cyclohexyl isocyanate), 2,2,4-trimethylhexamethylene diisocyanate, dimer acid diisocyanate, 3-isocyanatomethyl-3,5,5-trimethylcyclohexyl-isocyanate; and aromatic diisocyanates, such as 2,4-toluene diisocyanate, 2,6-toluene diisocyanate, chlorinated toluene diisocyanates, meta-phenylene diisocyanate, chlorinated meta-phenylene diisocyanate, orthophenylene diisocyanate, brominated-meta-phenylene diisocyanate, meta-xylylene diisocyanate, para-xylylene diisocyanate, naphthalene-1,4-diisocyanate, naphthalene-1,5-diisocyanate, naphthalene-2,7-diisocyanate, 4'4-biphenylene diisocyanate, 3,3'-dichloro-4,4'-biphenylene diisocyanate, 3,3'-dimethyl-4,4'-biphenyl diisocyanate,3,3'-dimethoxy-4,4'-biphenylene diisocyanate, 2,2',5,5'-tetramethyl-4,4'-biphentlene diisocyanate, 2-nitro-4,4'-biphenylene diisocyanate,3,3'-diphenyl-4,4'-biphenylene diisocyanate, 4,4'-methylene-bis-(phenyl isocyanate), 4,4'-methylene-bis(2-methylphenyl isocyanate), 4,4'-isopropylene-bis(phenyl isocyanate); and fluorene diisocyanate; triisocyanates, such as hexamethylene diisocyanate biurets, 4,4',4"-triphenylmethane triisocyanate and toluene-2,4,6-triisocyanate; isocyanurates, such as those based on hexamethylene diisocyanate or 3-isocyanatomethyl-3,5,5-trimethylcyclohexyl-isocyanate; tetraisocyanates and mixtures thereof.

Particularly useful isocyanates are polyfunctional aliphatic isocyanates based on hexamethylene diisocyanate (HDI). Some of the commercial HDIs include Tolonate® HDT or Tolonate® HDT LV from Rhone-Poulenc Inc. (Organic Chemical Division), Monmouth Junction, N.J. or Desmodur® N-3300 or Desmodur® N-3390 isocyanate from Bayer AG, Pittsburgh, Pa.

If desired the isocyanate cross linking component in the form of a prepolymer may also be utilized. Generally, the polyol is pre-reacted with isocyanate to form a polyhydroxy- or polyisocyanate-terminated quasi-prepolymer. These prepolymers are used for various reasons, such as to reduce the exotherm of the final polymerization reaction, to reduce the toxicity of monomeric isocyanates, or to reduce the viscosity of a particular polyol or isocyanate by reacting it with a more liquid isocyanate or polyol. Polyisocyanate-terminated prepolymers are prepared by reacting an isocyanate with less than a stoichiometric amount of a polyol.

If desired and depending on the intended use of the composition, additional components may be added either to the polymeric component or to the crosslinking component or to both. These additional components include but are not limited to the following materials:

1. Additives, such as rheology modifiers, dispersants, wetting agents, slip agents, mar reducing agents, defoamers, plasticizers and corrosion inhibitors;
2. Pigments, which include organic pigments, such as phthalo blue, phthalo green and inorganic pigments, such as titanium dioxide;
3. Extenders, such as calcium carbonate, talc, clays, silicas and silicates; and
4. Fillers, such as glass or polymeric microspheres, quartz and sand.

The foregoing components are preferably added to the polymeric component.

Since the compositions of this invention are reactive at ambient temperature, the total composition should not be mixed together until it is ready for use. These compositions therefore are handled as articles of commerce in the form of multi-package compositions. Each package of the multi-package composition may contain as many of the chemicals of the combination of the present invention as desired, provided the polyol and the cross linking component are in separate packages, that is, the polyol is in one package while the cross linking component is in another package. For example, one package may contain the polyol, carboxylic or sulfonic acid and the catalyst, and the other package may contain the polyisocyanate and the extender compound. In an alternative system, the polyol, the catalyst, carboxylic or sulfonic acid and the extender compound may be in one package and the polyisocyanate may be in the other The solvent may be in either package or it may be split between two packages. In some cases, it may be desirable to provide a three-package composition, for example, one in which the first package is a solvent solution of the polymeric component, the second package is a solvent solution of the cross linking component, and the third package is the combination of chemicals of the present invention. The combination of chemicals of the present invention is preferably included in the polymeric component of the thermosetting composition.

In accordance with the method of this invention for producing a coating on the surface of a substrate, the polymeric component of a thermosetting coating composition is mixed with the cross linking component of the coating composition to form a pot mix. The pot mix includes the combination of chemicals of the present invention in accordance with the alternative packages described earlier. A layer of the pot mix is applied under ambient conditions on the surface of the substrate, which upon cure results in the coating.

The thermosetting composition, which includes the combination of the chemicals of the present invention is particularly suitable for use in coatings over a wide variety of substrate surfaces, such as glass, metal, plastics, wood, leather, woven and non-woven fabrics and paper.

Due to their durable nature, the coating from the thermosetting composition, which includes the combination of the chemicals of the present invention may be used as durable long life traffic markings on road surfaces, including reflective road markings.

The thermosetting composition, which includes the combination of the chemicals of the present invention may be foamed by conventional means, such as by air or inert gas foaming means, to produce foams, which can be applied over a wide variety of surfaces or it may be cast or molded by conventional casting or molding means to produce articles having a desired shape.

TESTING PROCEDURES

The following test procedures were used for generating the data reported in the Examples below:

1. Dry-to-touch time measured in hours under ASTM D-1640-83.
2. Viscosity measured under ASTM D 2196 (Rheological properties of non-Newtonian materials by rotational (Brookfield) viscometer).

EXAMPLES

The following examples are illustrative of the invention and are not meant to limit it to their details.

The comparative Examples 1 through 5 and Example 6 described below in Tables 1, 2 and 3, utilized QR-1405® polyol at 84 percent solids supplied by Rohm and Haas Company, Philadelphia, Pa. in a polymeric component and Desmodur® N 3300 isocyanate supplied by Bayer AG, Pittsburgh, Pa. as a crosslinking component, which were mixed at a NCO/OH ratio of 1.2 to form a pot mix. Table 1 below describes the various combinations of the metal compound, benzoic acid and extender compound added to the polymeric component before the polymeric component was mixed with the cross linking component.

TABLE 1

|  | Metal Compd # | Benzoic acid | Extender Compd@ |
|---|---|---|---|
| Comp. Ex.1* | 0.005 | 0 | 0 |
| Comp. Ex.2* | 0.0075 | 0 | 0 |
| Comp. Ex.3* | 0.01 | 0 | 1.0 |
| Comp. Ex.4* | 0.01 | 0 | 2.0 |
| Comp. Ex.5* | 0.0075 | 0.3 | 0 |
| Example 6 | 0.0075 | 0.3 | 2.0 |

Metal Compd. means metal compound (dibutyl tin dilaurate) in weight percentage based on total weight polymeric component solids.
Extender Compd@ means extender compound (2,4 pentane dione) in weight percentage based on total weight polymeric component solids.
*Comp. Ex. means Comparative Example.

The viscosity in centipoise of the pot mixes was measured every half an hour. The results are reported in Table 2 below:

TABLE 2

| Time in hours | Comp. Ex.1* | Comp. Ex.2* | Comp. Ex.3* | Comp. Ex.4* | Comp. Ex.5* | Example 6 |
|---|---|---|---|---|---|---|
| 0 | 90 | 90 | 90 | 90 | 90 | 90 |
| 0.5 | 105 | 153 | 105 | 102 | 120 | 90 |
| 1.0 | 130 | 190 | 137 | 119 | 120 | 100 |
| 1.5 | 190 |  | 167 | 145 | 140 | 110 |
| 2.0 |  |  | 227 | 168 | 200 | 120 |
| 2.5 |  |  |  |  |  | 120 |
| 3.0 |  |  |  |  |  | 130 |
| 3.5 |  |  |  |  |  | 130 |
| 4.0 |  |  |  |  |  | 140 |
| 4.5 |  |  |  |  |  | — |
| 5.0 |  |  |  |  |  | 170 |
| 5.5 |  |  |  |  |  | 170 |

*Comp. Ex. means Comparative Example.

Layers from these various pot mixes were applied with a draw down bar over steel plates and the dry-to-touch time in hours of the layers from the various pot mixes was measured under ASTM D-1640-83. Table 3 below provides the pot life, dry-to-touch time in hours and the calculated ratio of pot life/drying time from the various pot mixes:

TABLE 3

|  | Comp. Ex.1 * | Comp. Ex.2 * | Comp. Ex.3 * | Comp. Ex.4 * | Comp. Ex.5 * | Example 6 |
|---|---|---|---|---|---|---|
| Pot Life in hours | 1.5 | 1.0 | 2.0 | 2.0 | 2.5 | 5.5 |
| Dry-to-Touch Time in hours | 7 | 7 | 5 | 5 | 5 | 4 |
| Ratio ** | 0.21 | 0.14 | 0.4 | 0.4 | 0.5 | 1.375 |

*Comp. Ex. means Comparative Example.
Ratio ** means Ratio of Pot life/Drying time.

Table 3 above, illustrates applicant's unexpected discovery. The pot mix of Example 6 had a higher pot life/drying time ratio than the pot life/drying time ratios from the pot mixes of comparative Examples 1, 2, 3, 4 and 5. Thus, it is seen that it is the combination of all three chemicals, i.e., the catalyst, carboxylic acid and the extender that provided the pot mix with an increased pot life/drying time ratio than those other combinations, which did not have the combination of chemicals of Example 6.

The comparative Examples 7 through 9 and Example 10 described below in Tables 4, 5 and 6, utilized QR-1281® polyol at 80 percent solids supplied by Rohm and Haas Company, Philadelphia, Pa. in a polymeric component and Desmodur® N 3300 isocyanate supplied by Bayer AG, Pittsburgh, Pa. as a crosslinking component, which were thoroughly mixed at a NCO/OH ratio of 1.2 to form a pot mix. Table 4 below describes the various combinations of the metal compound, benzoic acid and extender compound added to the polymeric component before the polymeric component was mixed with the cross linking component.

TABLE 4

|  | Metal Compd # | Benzoic acid | Extender Compd@ |
|---|---|---|---|
| Comp. Ex.7* | 0.01 | 0 | 0 |
| Comp. Ex.8* | 0.01 | 0.3 | 0 |
| Comp. Ex.9* | 0.01 | 0 | 2.0 |
| Example 10 | 0.01 | 0.3 | 2.0 |

Metal Compd. means metal compound (dibutyl tin dilaurate) in weight percentage based on total weight polymeric component solids.
Extender Compd@ means extender compound (2,4 pentane dione) in weight percentage based on total weight polymeric component solids.
*Comp. Ex. means Comparative Example.

The viscosity in centipoise of the pot mixes was measured every half an hour. The results are reported in Table 5 below:

TABLE 5

| Time in hours | Comp. Ex.7* | Comp. Ex.8* | Comp. Ex.9* | Example 10 |
|---|---|---|---|---|
| 0 | 255 | 255 | 263 | 247 |
| 0.5 | 274 | 270 | 288 | 270 |
| 1.0 | 297 | 296 | 312 | 289 |
| 1.5 | 329 | 331 | 347 | 316 |
| 2.0 | 365 | 362 | 361 | 348 |
| 2.5 |  |  |  |  |
| 3.0 |  |  |  |  |
| 3.5 |  |  |  |  |
| 4.0 | <u>517</u> | <u>523</u> | 474 | 452 |
| 4.5 | 574 | 620 | <u>519</u> | <u>499</u> |

*Comp. Ex. means Comparative Example.

Layers from these various pot mixes were applied with a draw down bar over steel plates and the dry-to-touch time in hours of the layers from the various pot mixes was measured under ASTM D-1640-83. Table 6 below provides the pot life, dry-to-touch time in hours and the calculated ratio of pot life/drying time from the various pot mixes:

TABLE 6

|  | Comp. Ex.7 * | Comp. Ex.8 * | Comp. Ex.9 * | Example 10 * |
|---|---|---|---|---|
| Pot Life in hours | 4.0 | 4.0 | 4.5 | 4.5 |
| Dry-to-Touch Time in hours | 7 | 4 | 7 | 4 |
| Ratio ** | 0.57 | 1.0 | 0.64 | 1.13 |

*Comp. Ex. means Comparative Example.
Ratio ** means Ratio of Pot life/Drying time.

Table 6 above, illustrates applicant's unexpected discovery. The pot mix of Example 10 had a higher pot life/drying time ratio than the pot life/drying time ratios from the pot mixes of comparative Examples 7, 8 and 9. Thus, it is seen that it was the combination of all three chemicals, i.e., the catalyst, carboxylic acid and the extender that provided the pot mix with an increased pot life/drying time ratio than those other combinations, which did not have the combination of chemicals of Example 10.

What is claimed is:

1. A thermosetting composition containing:
   (1) a polyol formed from at least one hydroxyl monomer;
   (2) an isocyanate crosslinking component, wherein the improvement comprises said composition further comprising:
   (3) 0.001% to 2.0% of a catalyst;
   (4) 0.05% to 2% of carboxylic or sulfonic acid; and
   (5) 1% to 10% of an extender compound selected from the group consisting of:
      (a) beta-dicarbonyl compounds;
      (b) alpha-hydroxy ketones;
      (c) fused aromatic beta-hydroxy ketones;
      (d) beta-hydroxy nitrogen-heterocyclic fused aromatics; and
      (e) combinations thereof;
   all percentages being in weight percentages based on the total weight of polyol solids of said thermosetting composition.

2. A method for increasing a pot life/drying time ratio of a thermosetting composition containing a polyol formed from at least one hydroxyl monomer, comprising the steps of:
   (1) mixing with said thermosetting composition a combination of chemicals comprising:
      (a) 0.001 to 2.0% of a catalyst;
      (b) 0.05 to 2% of carboxylic or sulfonic acid; and
      (c) 1 to 10% of an extender compound selected from:
         (A) beta-dicarbonyl compounds;
         (B) alpha-hydroxy ketones;
         (C) fused aromatic beta-hydroxy ketones;
         (D) beta-hydroxy nitrogen-heterocyclic fused aromatics; and
         (E) combinations thereof;
      all percentages being in weight percentages based on the total weight of polyol solids of said thermosetting composition; and
   (2) adding an isocyanate crosslinking component to said thermosetting composition.

3. The composition of claim 1 wherein said catalyst is dibutyl tin dilaurate.

4. The composition of claim 1 wherein said carboxylic acid is selected from the group consisting of acetic, propionic, acrylic, phenylacetic, benzoic, p-methylbenzoic, p-nitrobenzoic, p-chlorobenzoic, p-methoxybenzoic acids, and combinations thereof.

5. The composition of claim 1 wherein said sulfonic acid is selected from the group consisting of p-toluenesulfonic, methanesulfonic, benzenesulfonic acids, and combinations thereof.

6. A substrate coated with the composition of claim 1.

7. A method for increasing a pot life/drying time ratio of a thermosetting composition containing a polyol formed from at least one hydroxyl monomer and an isocyanate crosslinking component, comprising:
   mixing with said thermosetting composition a combination of chemicals comprising:
      (1) 0.001 to 2.0% of a catalyst;
      (2) 0.05 to 2% of carboxylic or sulfonic acid; and
      (3) 1 to 10% of an extender compound selected from the group consisting of:
         (a) beta-dicarbonyl compounds;
         (b) alpha-hydroxy ketones;
         (c) fused aromatic beta-hydroxy ketones;
         (d) beta-hydroxy nitrogen-heterocyclic fused aromatics; and
         (e) combinations;
      all percentages being in weight percentages based on the total weight of polyol solids of said thermosetting composition.

* * * * *